United States Patent
Bewlay et al.

(10) Patent No.: US 6,960,274 B2
(45) Date of Patent: Nov. 1, 2005

(54) TOOLING AND METHOD OF MANUFACTURING A MESH LAMINATE

(75) Inventors: John Bewlay, Virginia Beach, VA (US); Thomas Steinke, Columbia Heights, MN (US); Michael Appel, Mahtomedi, MN (US)

(73) Assignee: Weatherford/Lamb, Inc., Houston, TX (US)

( * ) Notice: Subject to any disclaimer, the term of this patent is extended or adjusted under 35 U.S.C. 154(b) by 355 days.

(21) Appl. No.: 10/212,674

(22) Filed: Aug. 5, 2002

(65) Prior Publication Data

US 2003/0029909 A1 Feb. 13, 2003

Related U.S. Application Data

(60) Provisional application No. 60/310,648, filed on Aug. 7, 2001.

(51) Int. Cl.[7] .............................................. B65H 81/00
(52) U.S. Cl. ....................... 156/188; 156/184; 156/187; 156/190; 156/289; 148/646; 148/512; 148/516; 148/519; 148/521; 148/523
(58) Field of Search .......................... 156/185; 148/646, 148/516; 442/29, 31

(56) References Cited

U.S. PATENT DOCUMENTS

| 4,313,996 | A | | 2/1982 | Newman et al. ............ 428/215 |
|---|---|---|---|---|
| 4,650,951 | A | | 3/1987 | Koga et al. .................. 219/118 |
| 4,851,057 | A | * | 7/1989 | Kessler, Jr. .................. 148/516 |
| 4,874,648 | A | * | 10/1989 | Hill et al. ................... 428/35.9 |
| 4,997,511 | A | * | 3/1991 | Newsom ...................... 156/382 |
| 5,401,344 | A | * | 3/1995 | Dickson et al. ............... 156/90 |
| 6,612,481 | B2 | * | 9/2003 | Bode .......................... 228/143 |

FOREIGN PATENT DOCUMENTS

| SU | 1389820 A1 | 4/1988 | ........... B01D/39/00 |
|---|---|---|---|
| SU | XP-002225433 | 4/1988 | ........... B01D/39/00 |

OTHER PUBLICATIONS

PCT International Search Report, International Application No. PCT/GB 02/03662, dated Jan. 7, 2003.

* cited by examiner

Primary Examiner—Blaine Copenheaver
Assistant Examiner—Chris Schatz
(74) Attorney, Agent, or Firm—Moser, Patterson & Sheridan LLP

(57) ABSTRACT

An apparatus and method of manufacturing a wire mesh laminate includes wrapping a central core with multiple layers of mesh screen and a barrier layer having a higher melting point than the mesh screen to form a spool assembly. The spool assembly is then surrounded by an outer cover and is heated to sinter or fuse together the layers of mesh screen.

38 Claims, 2 Drawing Sheets

TOOLING AND METHOD OF MANUFACTURING A MESH LAMINATE

CROSS-REFERENCE TO RELATED APPLICATIONS

This application claims benefit of U.S. provisional patent application Ser. No. 60/310,648, filed Aug. 7, 2001, which is herein incorporated by reference.

BACKGROUND OF THE INVENTION 1. Field of the Invention

The present invention relates to filtering materials and particularly to mesh laminates formed by a diffusion bonding process. 2. Description of the Related Art Wire mesh laminate material is typically made by fusing multiple sheets of mesh screen material together. In a conventional process, the sheets of mesh screen are placed between flat slabs and heated to a high temperature in a furnace. The heat from the furnace and pressure from the slabs serves to fuse the sheets of mesh screen together in a diffusion bonding process. In a conventional manufacturing process, sheets of wire mesh laminate are manufactured in approximately two-foot by four-foot sections. A method that allows for greater flexibility in the size of sheets of wire mesh laminate manufactured would be welcomed by users of such materials.

SUMMARY OF THE INVENTION

According to the present invention, a method of manufacturing a wire mesh laminate includes wrapping a central core with multiple layers of mesh screen and one or more barrier layers to form an assembly. Preferably, the barrier layer comprises a material having a higher melting point than the mesh screen. The assembly may be surrounded by an outer cover and heated to sinter or fuse together the layers of mesh screen.

In preferred embodiments, the central core is made of a material with a relatively high coefficient of thermal expansion and the outer cover comprises a material with a relatively low coefficient of thermal expansion. In one embodiment, the outer cover may comprise two half cylinders having bolt flanges secured together using one or more bolts. The spool assembly, which includes the central core wrapped in the layers of mesh screen and one or more barrier layers, is then banded and further covered with an additional barrier layer. The two outer cover halves are then bolted together over the spool assembly using bolts also made of a material with a relatively low coefficient of thermal expansion. In this way, as the entire covered assembly is heated, the central core expands relative to the outer cover. The expansion of the central core forces the layers of mesh screen against an inside surface of the outer cover, thereby exerting pressure on the wound layers of mesh screen.

Additional features and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
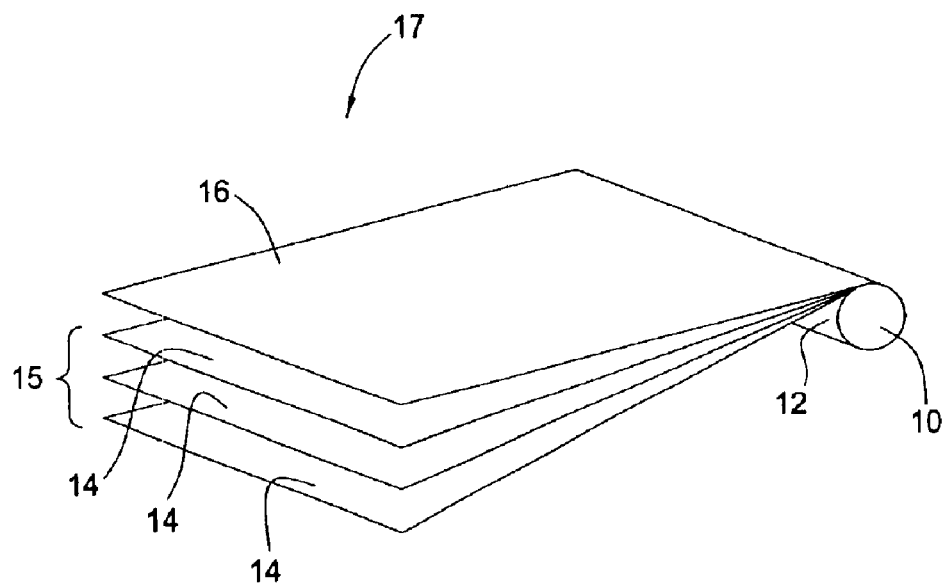
FIG. 1 is a perspective view of a series of mesh screen layers and a barrier layer being wound onto a central core in accordance with the present invention.

Referring to FIG. 1, a spool or central core 10 is wrapped in a first barrier layer 12. Preferably, the first barrier layer is made of material having a higher melting point than subsequently wrapped mesh screen layers 14. The first barrier layer 12 provides a barrier between the mesh screen 14 and the central core 10, so that the mesh screen does not fuse to the central core 10 when heated, as will be discussed below. A plurality of mesh screen layers 14, together comprising a lay-up layer 15, and a second barrier layer 16 are tightly wound around the central core 10. This creates a spool assembly 17 comprising a roll of multiple layers of mesh screen 14 separated by a barrier layer 16. In this way, as will be discussed below, the multiple layers of mesh screen 14 may fuse together when the spool assembly 17 is heated, but do not fuse to subsequent wraps or revolutions of the multiple mesh screen layers 14. Because the second barrier 16 prevents the multiple layers of mesh screen 14 from all fusing into a single mass, the aspects of the present invention provides an apparatus and method of creating a continuous roll of fused wire mesh laminate that is multiple layers thick.

Figure 2:
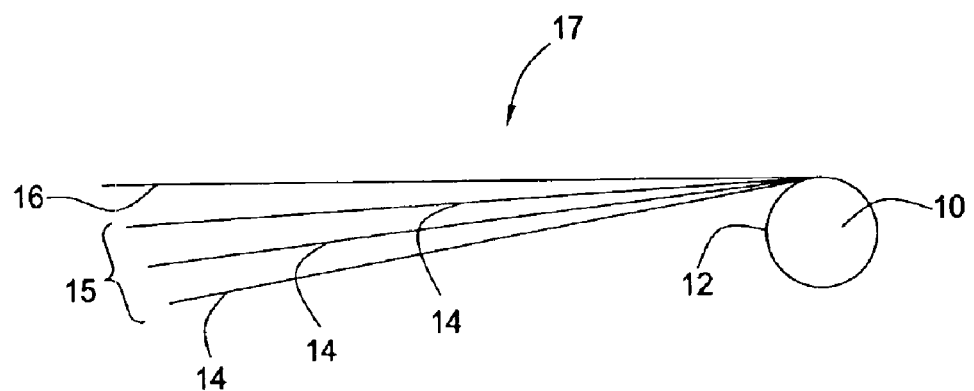
FIG. 2 is a side view of the layers of wire mesh and barrier layer being wound onto the central core.

As shown in FIG. 2, three layers of wire mesh 14 and a barrier layer 16 are tightly wound onto the central core 10 to ultimately create a wire mesh laminate material that is three layers thick. However, aspects of the present invention contemplate creating the lay-up layer 15 using one or more layers of mesh screen 14. Preferably, the lay-up layer 15 comprises two to five individual layers of wire mesh screen 14.

As discussed above, the barrier layers 12, 16 may comprise a material having a higher melting point than the mesh screen 14. For example, in the case where the mesh screen material is made of stainless steel, the barrier layers 12, 16 may be made of a material such as molybdenum, tungsten, ceramic, or combinations thereof. It must be noted that each of the barrier layers 12, 16 may comprise same or different materials. For example, the first barrier layer 12 may be made of molybdenum, while the second barrier layer 16 is made of tungsten.

Figure 3A:
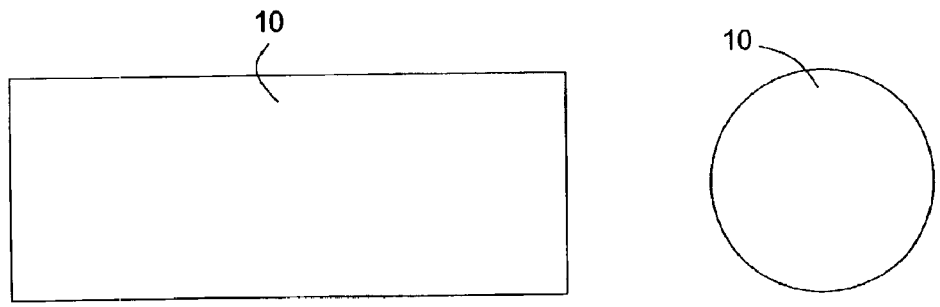
FIG. 3A illustrates a side view and sectional view of one embodiment of a central core according to aspects of the present invention.

FIG. 3A shows a side view and a sectional view of one embodiment of the central core 10 shown in FIGS. 1 and 2. As shown, the central core 10 comprises a solid. In another embodiment (not shown), the central core 10 may include a hollow center.

After the lay-up layer 15 and the barrier layer 16 are wound onto the spool 10, the resulting spool assembly 17 may be wrapped in an additional barrier layer (not shown) and banded to keep it from unraveling. An additional barrier layer (also not shown) may also be wrapped around the banded spool assembly. Again, these additional barrier layers may be of same or different material as previous barrier layers 12, 16.

Figure 4:
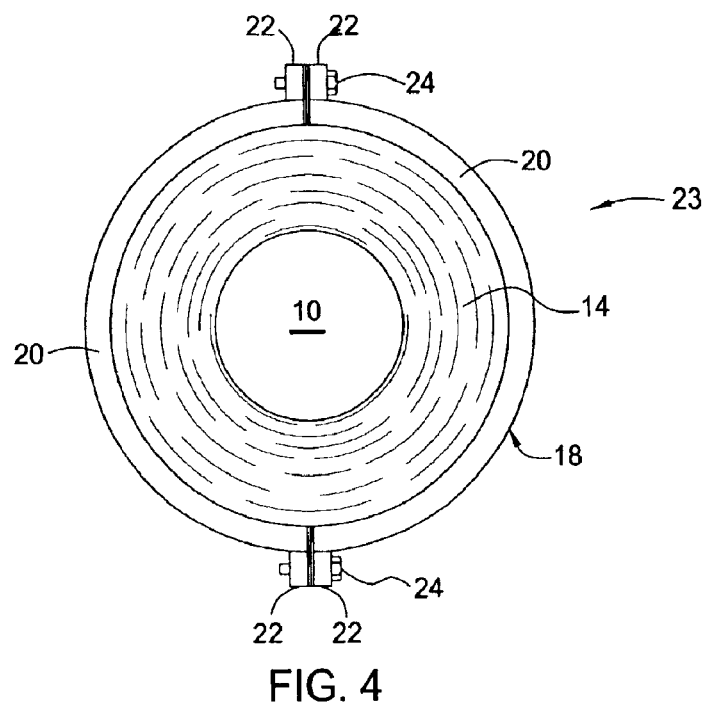
FIG. 4 is a sectional view of the central core wrapped in multiple layers of wire mesh screen and the barrier layer, with two halves of an outer cover bolted around the layers.

Next, as shown in FIG. 4, an outer cover 18 is disposed around the spool assembly 17 to tightly compress the spool assembly 17 and form a covered assembly 23. In one embodiment, the inner diameter of the outer cover 18 may be smaller than the outer diameter of the spool assembly 17, so that the outer cover 18 may exert pressure on the wound layers of mesh screen 14. Preferably, the outer cover 18 comprises two semi-cylindrical halves 20 bolted around the spool assembly 17 using bolts 24 through bolting flanges 22.

After the covered assembly 23 is formed, the entire covered assembly 23 including the spool assembly 17 and the outer cover 18 is placed in a furnace. The covered assembly 23 is heated to cause a diffusion bonding process sintering the multiple layers of mesh screen 14 together into a continuous laminate roll around the central core 10. Preferably, the covered assembly 23 is heated between about 50% to about 95% of the melting point of the mesh screen material. More preferably, the covered assembly 23 is heated between about 70% to about 90% of the melting point of the mesh screen material. For example, if stainless steel is used as the mesh screen material, then the covered assembly 23 may be heated between about 2,150° F. to about 2,350° F. Pressure created by tightly wrapping the multiple layers of mesh screen 14 around the central core 10, pressure from tightly bolting the outer cover 18 around the spool assembly 17, and pressure created by differential expansion tooling cooperate with the temperature of the furnace to aid in the diffusion bonding process.

Differential expansion tooling results from manufacturing the central core 10 out of a material having a relatively high coefficient of thermal expansion and manufacturing the outer cover 18 and bolts 24 out of a material having a relatively low coefficient of thermal expansion. In this way, as the covered assembly 23 is heated, the central core 10 expands relative to the surrounding outer cover 18, thereby squeezing the layers of mesh screen 14 (i.e., the lay-up layer 15) there between. For example, the outer cover 18 and bolts 24 may be made out of a material such as molybdenum, while the central core 10 may be made out of a material having a relatively higher coefficient of thermal expansion, such as stainless steel. The entire diffusion process is aided by heating the covered assembly 23 in the hydrogen atmosphere. It must noted that although hydrogen is disclosed herein, aspects of present invention contemplate heating the covered assembly 23 in a heating atmosphere having a different gas such as nitrogen, a mixture of gases, a vacuum, or a vacuum containing some type of gas as will be apparent to one of ordinary skill in the art.

Figure 3B:
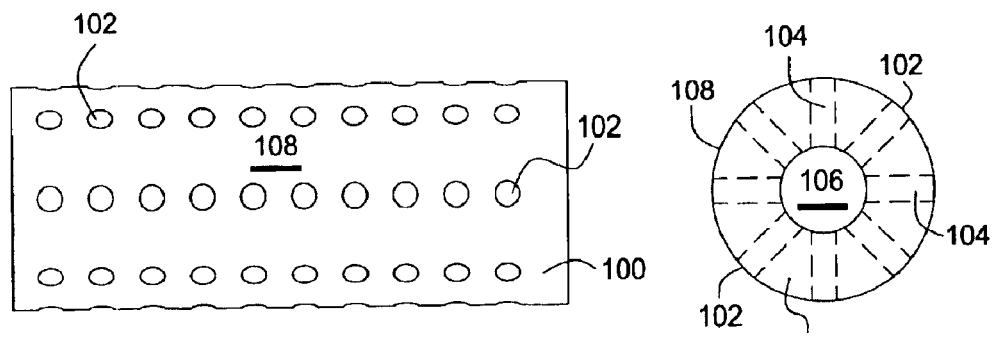
FIG. 3B illustrates a side view and sectional view of an alternate embodiment of a central core according to aspects of the present invention.

FIG. 3B shows a side view and sectional view of an alternative embodiment of a central core or spool 100 according to the present invention. As shown, the central core 100 includes perforations 102, which open into channels 104 providing passageways from within a hollow interior 106 of the central core 100 to an exterior surface 108 of the central core 100. In this way, the gas atmosphere within which the covered assembly 23 is placed can flow through the hollow interior 106 of the central core 100, through the channels 104, and exit to the exterior surface 108, thereby surrounding the layers of mesh screen with the gas such as hydrogen.

While the foregoing is directed to embodiments of the present invention, other and further embodiments of the invention may be devised without departing from the basic scope thereof, and the scope thereof is determined by the claims that follow.

What is claim is:

1. A method of manufacturing a mesh laminate screen, comprising:
   wrapping a plurality of mesh layers and a barrier layer around a central core to form an assembly, wherein the barrier layer comprises a material having a higher melting point than the plurality of mesh layers;
   heating the assembly; and
   forming the mesh laminate screen.

2. The method of claim 1, further comprising restraining expansion of the assembly.

3. The method of claim 2, wherein restraining expansion of the assembly comprises disposing a cover around the assembly.

4. The method of claim 3, wherein the cover comprises a material having a relatively low coefficient of thermal expansion.

5. The method of claim 3, wherein the cover comprises a first portion coupled to a second portion.

6. The method of claim 5, wherein the first portion is coupled to the second portion using one or more bolts.

7. The method of claim 3, wherein an inner diameter of the cover is smaller than an outer diameter of the assembly.

8. The method of claim 1, further comprising disposing a second barrier layer around the central core before wrapping the plurality of mesh layers.

9. The method of claim 8, further comprising surrounding the assembly with a third barrier layer.

10. The method of claim 9, further comprising banding the third barrier layer around the assembly.

11. The method of claim 10, further comprising surrounding the banded assembly with a fourth barrier layer.

12. The method of claim 9, wherein one or more of the barrier layers comprises a material having a higher melting point than the plurality of mesh layers.

13. The method of claim 1, wherein the central core comprises a material having a relatively high coefficient of thermal expansion.

14. The method of claim 13, wherein the central core has a higher coefficient of thermal expansion than a coefficient of thermal expansion of the cover.

15. The method of claim 1, wherein the plurality of mesh layers comprise stainless steel.

16. The method of claim 15, wherein the barrier layer comprises a material selected from the group consisting of molybdenum, tungsten, ceramic, and combinations thereof.

17. The method of claim 15, wherein the assembly is heated between about 2,150° F. to about 2,350° F.

18. The method of claim 1, wherein the assembly is heated between about 70% to about 90% of the melting point of the plurality of mesh layers.

19. The method of claim 1, wherein the assembly is heated in a heating atmosphere selected from the group consisting of a gas, a gas mixture, a vacuum, and combinations thereof.

20. The method of claim 1, wherein the assembly is heated in a heating atmosphere having a gas selected from the group consisting of hydrogen, nitrogen, and combinations thereof.

21. The method of claim 1, wherein the central core comprises one or more perforations.

22. The method of claim 1, further comprising fusing the plurality of mesh layers together.

23. A method of manufacturing a sintered mesh laminate, comprising:

surrounding a first barrier layer around a central core;

wrapping a plurality of mesh layers and a second barrier layer around the central core;

disposing a cover around the plurality of mesh layers and the second barrier layer, wherein the first and second barrier layers comprise a material having a higher melting point than the mesh layers; and heating the cover and the plurality of mesh layers.

24. The method of claim 23, wherein the central core is expanded upon heating.

25. The method of claim 24, wherein the expansion exerts a pressure against the plurality of mesh layers.

26. The method of claim 25, wherein the plurality of mesh layers is at least partially fused together.

27. The method of claim 23, wherein the cover and the spool assembly are heated in a heating atmosphere selected from the group consisting of a gas, a gas mixture, a vacuum, and combinations thereof.

28. The method of claim 23, wherein the cover and the plurality of mesh layers are heated between about 2,150° F. to about 2,350° F.

29. The method of claim 23, wherein the cover and the plurality of mesh layers are heated between about 50% to about 95% of the melting point of the plurality of mesh layers.

30. The method of claim 23, wherein the cover and the plurality of mesh layers are heated between about 70% to about 90% of the melting point of the plurality of mesh layers.

31. A method of manufacturing a mesh laminate, comprising:

wrapping a plurality of mesh layers and a barrier layer around a central core to form an assembly;

wherein the barrier layer comprises a material having a higher melting point than the plurality of mesh layers;

heating the assembly; and forming the mesh laminate.

32. A method of manufacturing a mesh laminate, comprising:

wrapping a plurality of mesh layers and a barrier layer around a central core to form an assembly;

heating the assembly;

forming the mesh laminate;

disposing a second barrier layer around the central core before wrapping the plurality of mesh layers; and surrounding the assembly with a third barrier layer.

33. The method of claim 32, further comprising banding the third barrier layer around the assembly.

34. The method of claim 33, further comprising surrounding the banded assembly with a fourth barrier layer.

35. The method of claim 32, wherein one or more of the barrier layers comprises a material having a higher melting point than the plurality of mesh layers.

36. A method of manufacturing a mesh laminate screen, comprising:

forming an assembly comprising;

disposing a first barrier layer around a central core;

wrapping a plurality of mesh layers and a second barrier layer around the central core;

surrounding the central core with a third barrier layer;

heating the assembly; and forming the mesh laminate screen.

37. The method of claim 36, further comprising surrounding the banded assembly with a fourth barrier layer.

38. The method at claim 36, wherein one or more of the barrier layers comprises a material having a higher melting point than the plurality of mesh layers.

* * * * *